United States Patent Office 3,344,448
Patented Oct. 3, 1967

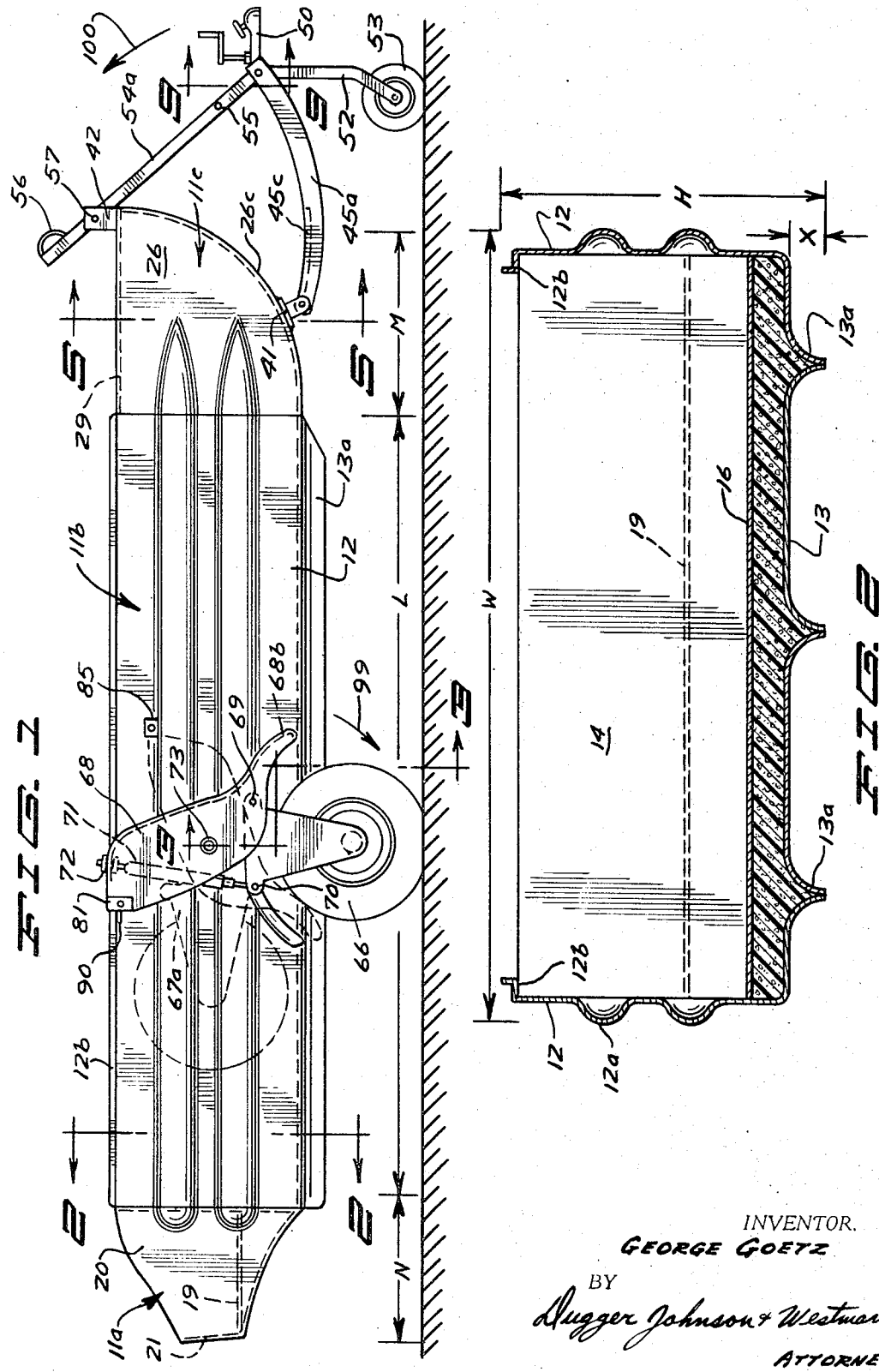

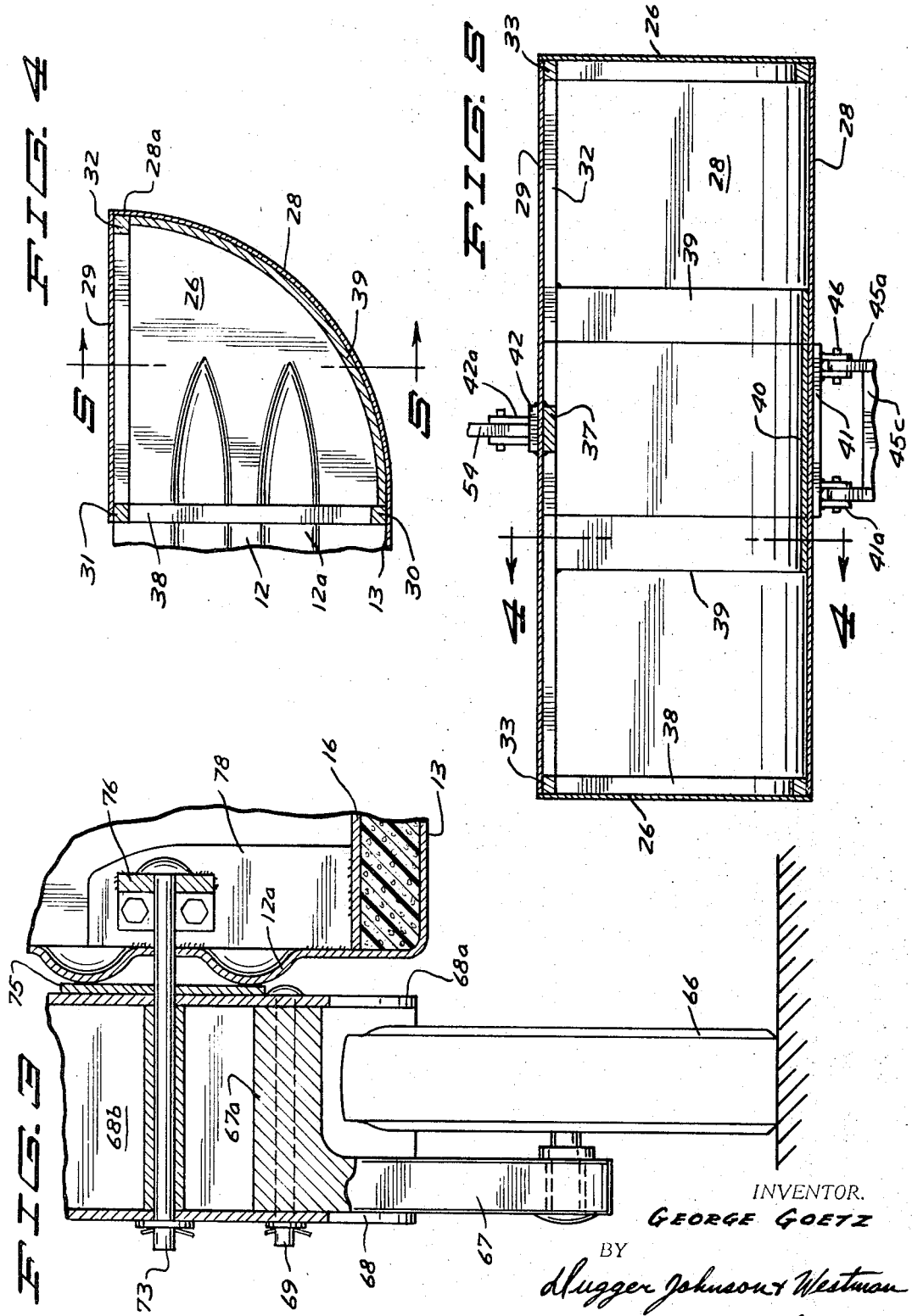

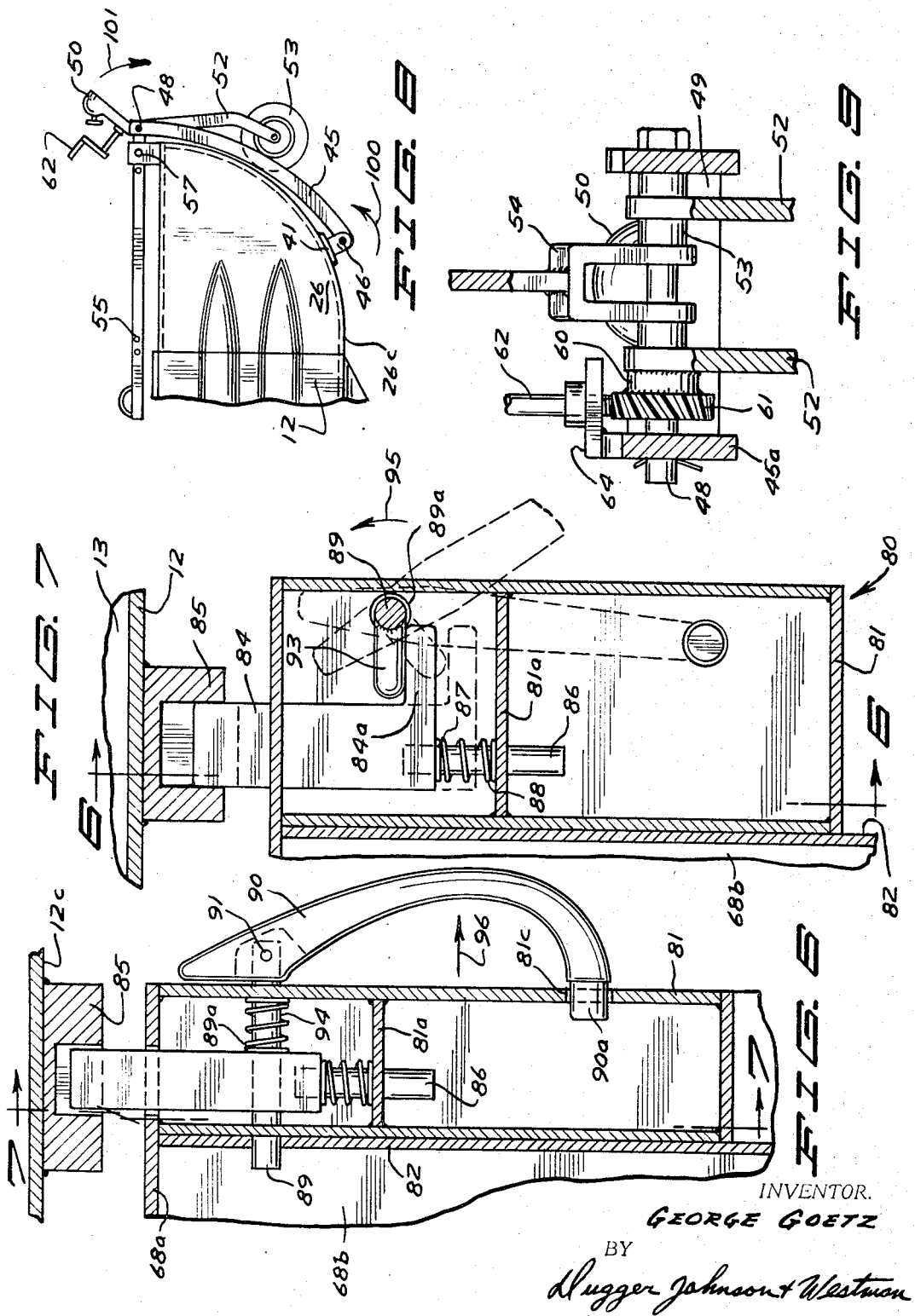

3,344,448
BOAT-TRAILER APPARATUS
George Goetz, 522 3rd St., Bismarck, N. Dak. 58501
Filed Aug. 4, 1966, Ser. No. 570,264
14 Claims. (Cl. 9—1)

This invention relates to a combination boat trailer apparatus. More particularly this invention relates to a shallow draft boat having wheels mounted thereon for movement between a lowered traveling condition and a raised retracted condition.

With ever increasing interest in water sports, including fishing and hunting, it is desired to be able to have a boat that may be readily hauled over relatively long distances, and then easily placed in a lake or other body of water; and after use, readily transported home. Accordingly, this invention has been made.

One of the objects of this invention is to provide new and novel boat apparatus having retractable wheels, and in a wheel retracted condition have a relatively shallow draft. Another object of this invention is to provide new and novel boat apparatus of relatively light weight and sturdy construction that has retractable wheels which, in a non-retracted condition, are suitable for transporting the apparatus over long distances, and in a retracted condition, to not substantially impede the movement of the boat through the water. An additional object of this invention is to provide boat trailer apparatus having new and novel retractable wheel assemblies including a front wheel assembly that may be easily moved between a retracted condition and a road travel condition while the occupant is in the boat. Another object of this invention is to provide new and novel boat trailer apparatus with a shallow draft and having minimum frame work while still being of a sturdy construction.

Other and further objects of this invention are those inherent in the invention illustrated and described, and claimed, and will become apparent as the description proceeds.

Referring now to the drawings in which the same reference numerals refer to the same parts and in which:

FIGURE 1 is a side view of the boat trailer apparatus of this invention with the wheel assemblies being shown in road travel condition in the solid lines, and one of the rear wheel assemblies being shown in a retracted condition in dotted lines;

FIGURE 2 is a traverse cross sectional view of the rear central section of the boat, said view being generally taken along the line and in the direction of arrow 2—2 of FIGURE 1;

FIGURE 3 is a fragmentary view, partly in cross section, illustrating one of the rear wheels and a portion of the mechanism mounting the rear wheel on the boat, said view being generally taken along the line and in the direction of arrow 3—3 of FIGURE 1;

FIGURE 4 is a fragmentary longitudinal cross sectional view of the front section of the boat, said view being generally taken along the line and in the direction of arrows 4—4 of FIGURE 5 to illustrate a portion of the frame work of the boat;

FIGURE 5 is a tranverse cross sectional view of the front section of the boat, said view being generally taken along the lines and in the direction of arrows 5—5 of FIGURES 1 and 4 respectively, and illustrating the mounting of the front wheel assembly on the boat;

FIGURE 6 is an enlarged transverse, vertical cross sectional view of the latch mechanism for releasably holding one of the rear wheel assemblies in a retracted condition, or alternately in a lowered road traveling condition, except for the second latch block not appearing on this view, said view being generally taken along the line and in the direction of the arrows 7—7 of FIGURE 6;

FIGURE 7 is a horizontal cross sectional view of the mechanism of FIGURE 6, said view being generally taken along the line and in the direction of arrows 7—7 of FIGURE 6;

FIGURE 8 is a fragmentary side view of the front section of the boat, said view illustrating the front wheel assembly in a fully retracted condition; and FIGURE 9 is a fragmentary cross sectional view of a portion of the mechanism for moving the front wheel between a traveling condition and a retracted condition.

Referring now in particular to FIGURES 1 and 3, the apparatus of this invention includes a water tight shell, which for purposes of facilitating description of this invention will be referred to as a front section generally designated 11a, a central section generally designated 11b, and a rear section generally designated 11c. The central section 11c includes opposite side walls 12 and a bottom wall 13 that are joined together along their contiguous edges. As may be noted from FIGURE 2, each of the side walls have a plurality of reinforcing corrugations 12a that are concavely curved in transverse cross section, and other than for said corrugations and top flanges 12b, are vertical; while the bottom wall 13 is flat in a horizontal plane other than for the longitudinally extending reinforcing ribs 13a. Also to be noted from FIGURE 2 is that there are provided a plurality of reinforcing ribs 13a across the width of the boat shell. The bottom wall is covered with a substantial thickness of urethane foam 15 while a mat 16 is provided on top of the foam such as illustrated in FIGURE 2. The central portion of the shell throughout its length and transversely between flanges 12b is open for access to the interior thereof.

The rear portion of the shell has a horizontal wall 19, side walls 20 and a back wall 21, the side walls 20 and side walls 12 having contiguous edges joined together. A divider wall 14 separates the central section from the rear section, wall 14 having edges joined to walls 20 and 13 respectively, while one edge of wall 19 is also joined to wall 14. Walls 14 and 19–21 form a compartment in which a motor may be stored and other miscellaneous equipment such as gas tanks. Further the wall 21 is of sufficient rigidity for mounting an outboard motor in a conventional manner.

Referring now in particular to FIGURES 1, 4, 5 and 8, the front shell section 11c includes side walls 26 that respectively have a vertical edge joining to the forward edge of the adjacent side wall 12, a generally horizontal top edge, and an arcuate curved edge 26c that is curved upwardly in a forwardly direction. A front wall 28 that in longitudinal cross section throughout the transverse width thereof is same curvature as edge 26c, extends between walls 26 and a has a rear edge joined to the front edge of wall 13, and a front upper edge 28a that is joined to the top plate 29. Plate 29 extends longitudinally rearwardly from edge 28a and terminates vertically above the rear edge of front wall 28.

A framework is provided for supportingly mounting walls 26, 28 and 29, the framework including a transverge bottom brace 30 at the juncture of walls 28 and 13, a transverse top brace 31 directly above brace 30 and adjacent the rear edge of wall 29, and a top front brace 32 at the juncture of walls 28 and 29. A pair of longitudinal top braces 33 are provided, one top brace being provided along the line of juncture of each side walls 26 with the top wall 29. Braces 33 extend between and are joined to braces 31, 32. A centrally located, longitudinally extending brace 37 has the top wall 29 welded thereto and at one ends is joined to brace 31 and at the opposite end to brace 32.

Mounted in abutting relationship with each of the side walls 26 and welded thereto is an arcuately curved brace 38 which at one end is joined to brace 32 and at the opposite end to brace 30. The front wall 28 is welded to braces 30 along their arcuate length. Also welded to the front wall are a pair of arcuate plates 39, said plates 39 being mounted in transverse spaced relationship and having their front ends joined to brace 32 and their opposite ends joined to brace 30. A transverse reinforcing plate 40 has its opposite ends joined to plates 39 and is located more closely adjacent brace 30 than brace 32.

A mounting member 41 having two sets of closely spaced tabs 41a is secured to wall 28 opposite brace 40 and directly underlies said plate 40, while a locking pivot mount bracket 42 is attached to plate 29 in directly overlying relationship to brace 32. Bolts (not shown) are provided for bolting plate 40 and member 41 together while bracket 42 is bolted (bolts not shown) to brace 32. Members 41 and 42 pivotally mount the front wheel assembly for movement between a retracted position of FIGURE 8 and a transport position of FIGURE 1 together with releasably holding the wheel assembly in a selected one of said positions.

The front wheel assembly includes an elongated support member 45 having a pair of elongated legs 45a and a web portion 45c joining said legs. The one end of each leg is pivotally connected by a pivot member 46 to an adjacent pair of tabs of mounting member 41 (see FIGURE 5). As may be noted from the drawings the pivot connections to the mounting member 45 is exterior of the shell. The opposite end portions of legs 45a pivotally mount a pivot member 48 while a transverse plate 49 is welded to the forward ends said legs adjacent to but forwardly of the pivot member 48 (forwardly when the support member is in the FIGURE 1 position). A conventional trailer hitch member 50 is welded to plate 49.

Pivotally mounted on pivot member 48 intermediate legs 45a are the one ends of a pair of elongated wheel mounting arms 52, the opposite ends of said arms cooperatively mounting a front wheel 53. Intermediate the wheel mounting arms 52 and on pivot member 48 are a pair of spacers 53, one end of an elongated control arm 54 being pivotally retained on the pivot member intermediate said spacers. The control arm extends upwardly between the clevis legs 42a of the locking member 42 and has a handle grip portion 56 on its opposite end. Intermediate the handle grip portion and pivot member 48, the control arm has a plurality of spaced apertures 55, one aperture being located to have a locking pin 57 extended therethrough and through legs 42a to releasably lock the control arm in the position of FIGURE 1 where in the wheel 53 bears against the ground. Another aperture 55 is located in a position to have the locking pin 57 extend therethrough when the support member 45 is in the retracted condition illustrated in FIGURE 8 where in the support member along its elongated length extends closely adjacent the front wall 28.

In order to move wheel 53 relative the support member from a position closely adjacent the support members as illustrated in FIGURE 8 to a position substantially more remote relative to the support member and vertical beneath pivot member 48 as illustrated in FIGURE 1, a gear member 60 is provided on shaft 48 for rotation relative thereto and is welded to one arm 52 (see FIGURE 9). The gear member 60 is driven by a worm 61 that is integrally joined to the lower end of the hand crank 62. The hand crank is mounted by a bracket 64 which in turn is welded to one leg 45c of the support member 45.

Referring now in particular to FIGURES 1 and 3, there is provided a rear wheel assembly on each side of the boat (only one shown), each rear wheel assembly including a rear wheel 66 that is rotatably mounted on one end portion of wheel mount 67. The opposite end portion 67a of the wheel mount is of substantially greater transverse width and extends transversely across the wheel. Portion 67a has one end pivotally connected to a wheel support bracket 68 by a pivot member 69. The support bracket has a pair of transversely spaced legs 68a and a web portion 68b joining said legs. As may be noted from FIGURE 3 a part of the wheel mount is located between the legs 68a. The opposite end of portion 67a of the wheel mount has a pivot member 70 that mounts one end of the shock absorber 71. The opposite end of the shock absorber is connected to the bracket web portion 68b at 72. As may be noted from FIGURE 1 the connection 72 and pivot members 69 and 70 are located at what would be apexes of a triangle. Somewhat centrally located relative members 69, 70 and 72 is a pivot member 73, said pivot member being located somewhat above and rearward of the horizontal and vertical center of side wall 12, and extended through legs 68a, a plate 75, side wall 12, and a short length plate 76. Plate 75 is welded to adjacent pair of corrugations 12a and bears against the support bracket 68 while permitting the bracket to be pivoted relative thereto.

The short plate 76 at each end is bolted to an upright 78 within the interior of the shell 11, each upright 78 in turn being welded to the side wall 12. In this connection the spacing of the uprights 78 is less than the diameter of the wheel 66.

A fender 79 is welded to portion 68b adjacent pivot 70 and curves rearwardly and downwardly in the FIGURE 1 solid line position of the rear wheel assembly. In the wheel assembly dotted line position, the web 68b is curved through various radii of curvature to extend generally downwardly and rearwardly; and in part underlays and extends to a lower elevation than the rear wheel.

For each rear wheel assembly there is provided latch mechanism, generally designated 80, for holding the wheel assembly in its respective pivoted condition. The latch mechanism includes a latch box 81 that is secured to an angle bracket 82, said angle bracket in turn being welded to an upper rearward edge of web 68b (FIGURE 1 solid line position) and also welded at opposite transverse end portions to the legs 68a. The latch box mounts for limited transverse slidable movement a latch bar 84, the latch bar being mounted for movement between a position in latching engagement with a latch block 85 and a position out of and clear of said latch block. There are provided two latch blocks that are welded to side wall 12, one latch block being located in a position for receiving the latch bar when the wheel support bracket is in rear wheel assembly solid line transport position of FIGURE 1 and a second latch block is in a position for receiving the latch bar when the wheel support bracket is in the dotted line position of said figure. One latch block is located for locking the rear wheel assembly with the rear wheel directly below pivot 73, and the other for retaining the wheel generally horizontally rearwardly of pivot 73.

The latch mechanism also includes a plunger 86 that is slidably mounted in the latch box partition 81a, said plunger having an enlarged diameter flange 87 that bears against the latch box partition. A coil spring 88 is provided on the plunger and has one end bearing against the partition and an opposite end bearing against the flange 87 for resiliently urging the plunger toward the side wall 12, one end portion of the plunger being seated in an aperture provided in the latch bar. An elongated handle pin 89 is slidably mounted by the latch box to extend therethrough including one end portion slidably extended through an appropriate aperture provided in the angle bracket 82. The opposite end portion of handle pin 89 is pivotally connected to the latch handle 90 at 91 so that the handle can only pivot relative to pin 89 about an axis that extends at right angles to the axis of elongation of pin 89. The handle pin 89 has an enlarged diameter flange 89a within the latch box, there being provided a spring 94 that at one end seats against said flange and at the opposite end against the latch box for resiliently urging the handle toward abutting contact with the latch box.

The latch pin is located transversely between a right angular leg 84a of the latch bar and the adjacent side wall 12, there being provided a radially extending arm 93 welded to the latch pin 89 for angular movement with the latch pin between a position bearing against arm 84a and a position out of contact therewith. The arm 93 can be angularly moved from the solid line position of FIGURE 7 to the dotted line position thereof by pivoting the handle in the direction of the arrow 95 about pin 89 which will move the latch bar 85 from the latched condition of FIGURE 7 to a position clear of the latch block against the action of spring 88. Acting in cooperation with spring 94 and pin 89 to releasably hold handle 90 in a locked condition, the opposite end of the handle has a reduced diameter end portion 90a that is extendable into an aperture 81c of the latch box. However, by translating the handle 90 in the direction of the arrow 96, the pin 89 will be moved the same amount in the same direction against the action of spring 94 while the end portion 90a is being pulled out of aperture 81c. After end portion 90a has cleared the latch box, then the handle may be pivoted in the direction of arrow 95 as indicated above to release the latch bar. When it is desired to again operate the latch bar to a latching condition, then the handle can be pivoted in the direction opposite arrow 95 and then the handle moved to a position that end portion 90a is extended into aperture 81c.

The structure of this invention having been described, the operation thereof will be set forth. Assuming that the apparatus of this invention is in traveling condition such as illustrated in FIGURE 1, the trailer hitch member 50 is suitably connected to a bumper of an automobile and is moved to a lake shore. After the boat trailer apparatus has been disconnected from the automobile, it is then wheeled into the lake and while the operator is sitting in the boat, he may operate the handle 90 in the manner previously described to operate the latch bar to an unlatched condition. Thereupon the wheel support bracket is pivoted in the direction of the arrow 99 about pivot member 73 to the dotted line position of FIGURE 1 and thence the handle operated to permit the latch bar moving into the lower forward latch block 85 shown in said figure. The handle is operated so its reduced diameter portion 90a extends into the latch box aperture. This is also done for the other rear wheel assembly.

Now, upon removing the lock pin 57, the control arm 54 is moved from the FIGURE 1 position to pivotally retract support member 45 (in the direction of arrow 100) about pivot pins 46 to the solid line position of FIGURE 6. Then the lock pin 57 is inserted through the locking member apertures and the adjacent aperture 55 for locking the control arm and support member in the last mentioned position. Thereafter the hand crank 62 is turned in an appropriate direction whereupon worm 61 is rotated to rotate gear 60 in the direction of arrow 101 about pivot member 48. Rotating gear 60 in this direction causes the wheel support arms 52 to be moved in a corresponding direction whereby the front wheel is moved from a position generally forwardly and remote from brace 32 to a position closely adjacent the front wall of the boat and at an elevation vertically intermediate braces 30, 32. In this connection the support bracket web 45c terminates sufficiently remote from the pivot member 48 so that the wheel can be moved into abutting engagement with front wall 28. When the front and rear wheels are in a retracted condition, they are at an elevation above the normal level of water. Now the boat is ready for use.

When it is desired to remove the boat from the water, when one is at sufficient depth that the wheels upon being lowered will nearly bear against the bottom of the lake, the handle crank is turned until the wheel 53 is moved relative the support member to a position the arms 52 extend at an angle thereto such as illustrated in FIGURE 1. Thereupon the lock pin 57 is removed and the handle portion 56 pushed forwardly and pivoted relative the shaft 48 until the wheel 53 is located relative the boat such as illustrated in FIGURE 1. Thereupon the lock pin 57 is again reinserted in bracket 42 for locking the control arm in this position. Also the latch handles and latch mechanism are operated to unlatch the latch bars from the forward latch boxes, and the rear wheel supports pivoted in the direction opposite arrow 99 until the rear wheels are in a downward depending position as illustrated in FIGURE 1. The latch handles are again operated so that the latch bars are moved into latch engagement with the latch blocks are are longitudinally adjacent the latch box illustrated in solid lines in FIGURE 1 and portions 90a extend into their latch box apertures. Thereafter the boat may be wheeled to shore.

Preferably, the boat shell is made of aluminum because of its relative lightweight. Further, there is no framework intermediate the front section 11c and the rear section 11a other than for two uprights 79 and brace 76 for each rear wheel assembly. However, due to the provision of the side wall corrugations 12a and the ribs 13a the boat is of sufficiently sturdy construction. In order to better illustrate the invention, one model thereof has a width W of 72 inches, a height H of 29½ inches with the ribs 13a having a height dimension X of 3½ inches, an overall length L for the center section of 110 inches, a length M for the front section of 28 inches and a length N of the rear section of 18 inches.

Due to the substantially flat bottom construction, other than for a plurality of longitudinally extending reinforcing ribs, the boat apparatus is a very shallow draft and extremely satisfactory for operating in shallow lakes or marshes for hunting and fishing. Also, due to the relatively slight weight and the provision of retractable wheel mechanism, it is easily placed in and removed from a body of water.

What I claim is:

1. Boat apparatus comprising a longitudinally elongated boat shell having a bottom wall, said bottom wall having a plurality of transversely spaced, longitudinally extending reinforcing ribs and horizontal planar sections intermediate said ribs, side walls, and a front wall, a front wheel assembly, said front wheel assembly including a front wheel and means mounted on a boat shell for mounting and moving the front wheel between a road traveling condition extending forwardly and below the boat shell and a retracted condition closely adjacent said front wall and at a higher elevation than the bottom wall, and means for releasably locking said front wheel mounting means in a selected one of its positions, and a rear wheel assembly for either side of said boat, each rear wheel assembly including a rear wheel, a transverse pivot member extending outwardly of the respective side wall, means for mountingly retaining the pivot member relative the side wall, and means pivotally mounted on the pivot member for mounting and moving the rear wheel between a position depending below the bottom wall and a retracted position at a higher elevation than the bottom wall, and means for releasably locking the rear wheel mounting means in a selected one of its positions.

2. The apparatus of claim 1 further characterized in that the front wheel mounting means includes an elongated support member having a first end portion and a second end portion, means for pivotally connecting the first end portion to the boat shell, a second pivot member mounted on said second end portion, elongated first means pivotally mounted on said second pivot member for mounting the front wheel, and second means connected to the support member and said first means for selectively retaining the front wheel in a selected pivoted position relative the support means.

3. The apparatus of claim 2 further characterized in that front wheel locking means includes an elongated control bar having an end portion pivotally connected to said second pivot member and an opposite end portion, and means mounted on the boat shell and cooperating with the control arm for locking the control arm in a selected adjusted position along its length.

4. The apparatus of claim 2 further characterized in that said boat shell has a front wall that throughout its transverse width is of the same curvature and is arcuately curved upwardly in a forward direction, said support member being arcuately curved to extend closely adjacent and along the front wall in a front wheel retracted position, and that said second means includes a gear member fixedly connected to the first means and pivotally mounted on the second pivot member, and gear operating means on the support member for selectively pivoting the gear member to move the first means from a position the front wheel is closely adjacent the front wall when the support member extends closely adjacent along said front wall and a position the front wheel is substantially more remote from said support member.

5. The apparatus of claim 1 further characterized in that each rear wheel mounting means includes a support bracket pivotally mounted on said pivot member, a wheel mounting member of a generally triangular shape having a first corner portion pivotally connected to said support means, a second corner portion and a third corner portion, shock absorber means interconnecting said second corner portion and the support bracket, the rear wheel being mounted on said third corner portion.

6. The apparatus of claim 5 further characterized in that said pivot member is generally centrally located relative said first and second corner portions and the connection of the shock absorber means to the support bracket, that said third corner portion is located opposite the first and second corner portions from said pivot member and that the rear wheel locking means includes a pair of latch blocks mounted in spaced relation on the side wall and latch mechanism mounted on the support bracket for latchingly engaging the adjacent latch block, one latch block being located relative the pivot member for being latchingly engaged to retain the support member, and thereby the wheel mounting member with the rear wheel in the first mentioned rear wheel position.

7. The appartus of claim 6 further characterized in that the support bracket has a forward web portion and legs in part extending along transversely opposite side of said wheel mounting member, and that the other latch block is mounted on the side wall at a location to be latchingly engaged by the latch mechanism for retaining the support bracket and the wheel mounting member in a position that the rear wheel is located generally horizontally rearwardly of said pivot member.

8. The apparatus of claim 6 further characterized in that said pivot member mounting means includes a pair of uprights located in the boat shell and welded to the adjacent side wall and a brace of a length less than the outside diameter of a rear wheel joined to said uprights for supporting the pivot member.

9. The apparatus of claim 8 further characterized in that said boat shell has a front section, a rear section and a central section of a length several times greater than the length of each of the front and rear sections, said central section having the bottom wall, said front section having a top wall, a front wall and side walls, and a frame supportingly mounting said front section walls, said central section being free of framing intermediate the front section and one upright and intermediate the rear section end the other upright.

10. Boat apparatus comprising a longitudinally elongated boat shell made of aluminum and having a front section, a rear section and a central section joining said front and rear sections, said central section being several times longer than each of said front and rear sections, said central section including a bottom wall having transversely spaced, longitudinally extending reinforcing ribs and horizontal planar sections intermediate and joining adjacent reinforcing ribs, and side walls joined to said front wall, said front section having a forwardly extending, upwardly curved front wall, a top wall overhanging said front wall and frame means for mounting said front and top walls, a rear wheel assembly, including a rear wheel for each side wall, means mounted on the respective side wall for mounting each rear wheel assembly to pivot about a transverse axis between a ground engaging position and an elevated position at a higher elevation than said bottom wall, and cooperating latch means on the side walls and the rear wheel assemblies for retaining the rear wheels in the selected one of said rear wheel positions, a front wheel assembly including a front wheel and means mounted on the front section for selectively retaining the front wheel in a ground engaging position forwardly of the front section and extending to a lower elevation than said bottom wall, and alternately in a retracted position closely adjacent said front wall at a higher elevation than said bottom wall.

11. The apparatus of claim 10 further characterized in that the frame means includes a top transverse brace adjacent the top and front walls, a bottom transverse brace adjacent the central section, a pair of transversely spaced plates joined to said top and bottom braces, and a transverse plate joining said plates and abutting against the front wall, and that the front wheel retaining means includes an elongated support member having a first end portion and a second end portion, means mounted on the shell surface opposite the transverse plate for pivotally mounting said first end portion, first means mounted in the second end portion for mounting the front wheel, a locking member mounted on the top wall, and means pivotally connected to the first means and acting in cooperation with the locking means for retaining the first means and the support member in front wheel ground engaging position and alternately in the front wheel elevated position.

12. Boat apparatus comprising a longitudinally elongated boat shell having a front section, a central section and a rear section, said central section having side walls and said front section having a forwardly extending, upwardly curved front wall and a top wall, a rear wheel assembly for each side wall, each rear wheel assembly including a rear wheel, and means mounting each rear wheel assembly on the respective side wall for movement about a transverse axis between a lowered rear wheel ground engaging position and an elevated position, a front wheel, an elongated support member having one end portion pivotally connected to the lower end of said front wall and an opposite end portion, first means mounted on said opposite end portion for mounting the front wheel, elongated control means having one end portion pivotally connected to said first means for moving the support member between a position the front wheel engages the ground and a position the front wheel is elevated and more closely adjacent the front wall, and means mounted on the top wall for lockingly holding the control means to retain the support member in the selected one of its positions.

13. The apprartus of claim 12 further characterized in that the support member is of a length to in the first mentioned support member position extend a substantial distance forwardly of said shell and in its second position to extend to a higher elevation than said shell, and that the control means comprises and elongated member having a handle grip portion.

14. The apparatus of claim 12 further characterized in that each rear wheel assembly includes a wheel mounting member, a support bracket pivotally on the wheel assembly mounting means, a shock absorber pivotally connected to the wheel mounting member and connected to support bracket, and means pivotally connecting the support bracket to the wheel mounting member at a location substantially spaced from the aforementioned connections of the shock absorber to the support bracket and wheel mounting member.

References Cited
UNITED STATES PATENTS 3,114,157 12/1963 Stockmann _____ 9—1 X
3,158,881 1/1964 Clausen _____ 9—1

FERGUS S. MIDDLETON, *Primary Examiner.*

T. M. BLIX, *Assistant Examiner.*